US012773741B2

(12) United States Patent
Kriegl et al.

(10) Patent No.: US 12,773,741 B2
(45) Date of Patent: Oct. 27, 2026

(54) CABLE SAW

(71) Applicant: Schwing GmbH, St. Stefan im Lavanttal (AT)

(72) Inventors: Daniel Kriegl, Rosenthal a.d.K (AT); Markus Hatzer, Virgen (AT); Max Friesacher, Wolfsberg (AT); Johann Schabelreiter, Pernegg (AT); Stefan Hörhan, Ehrenhausen (AT); Jörg Edler, Köflach (AT)

(73) Assignee: SST Stahl GmbH, St. Stefan im Lavanttal (AT)

(*) Notice: Subject to any disclaimer, the term of this patent is extended or adjusted under 35 U.S.C. 154(b) by 84 days.

(21) Appl. No.: 18/276,610

(22) PCT Filed: Feb. 10, 2022

(86) PCT No.: PCT/EP2022/053198
§ 371 (c)(1),
(2) Date: Aug. 9, 2023

(87) PCT Pub. No.: WO2022/171719
PCT Pub. Date: Aug. 18, 2022

(65) Prior Publication Data

US 2024/0116120 A1 Apr. 11, 2024

(30) Foreign Application Priority Data

Feb. 12, 2021 (AT) .............................. A 50093/2021

(51) Int. Cl.
*B23D 57/00* (2006.01)
*B28D 1/08* (2006.01)

(52) U.S. Cl.
CPC ..... *B23D 57/0061* (2013.01); *B23D 57/0069* (2013.01); *B28D 1/088* (2013.01)

(58) Field of Classification Search
CPC . B23D 57/0061; B23D 57/0069; B28D 1/088
(Continued)

(56) References Cited

FOREIGN PATENT DOCUMENTS

| | | | | |
|---|---|---|---|---|
| DE | 202004016488 U1 | 12/2004 | | |
| EP | 1598161 A1 * | 11/2005 | ............... | B28D 1/08 |

(Continued)

OTHER PUBLICATIONS

International Search Report and Written Opinion issued in International Application No. PCT/EP2022/053198, mailed May 25, 2022 (7 pages).

*Primary Examiner* — Nhat Chieu Q Do
(74) *Attorney, Agent, or Firm* — Faegre Drinker Biddle & Reath LLP

(57) ABSTRACT

A cable saw for cutting a workpiece includes a circulating saw cable, a guide device, and a cable storage device and cable tensioning device. The saw cable is driven by a drive and includes a sawing section. The guide device is arranged to move the sawing section along a cutting direction for cutting engagement with the workpiece. The guide device is arranged to allow several movement directions including the cutting direction and at least one lengthening or shortening of the sawing section. The cable storage device and cable tensioning device is arranged for storing, releasing and/or tensioning the saw cable when changing a position and/or length of the sawing section. The guide device includes a lever gear with a pivot lever rotatably hinged to a base holder. The lever gear is arranged to convert a rotational movement of the pivot lever into a movement of deflection rollers—which form the sawing section therebetween—to lengthen and/or shorten the sawing section.

14 Claims, 11 Drawing Sheets

Figure 1:
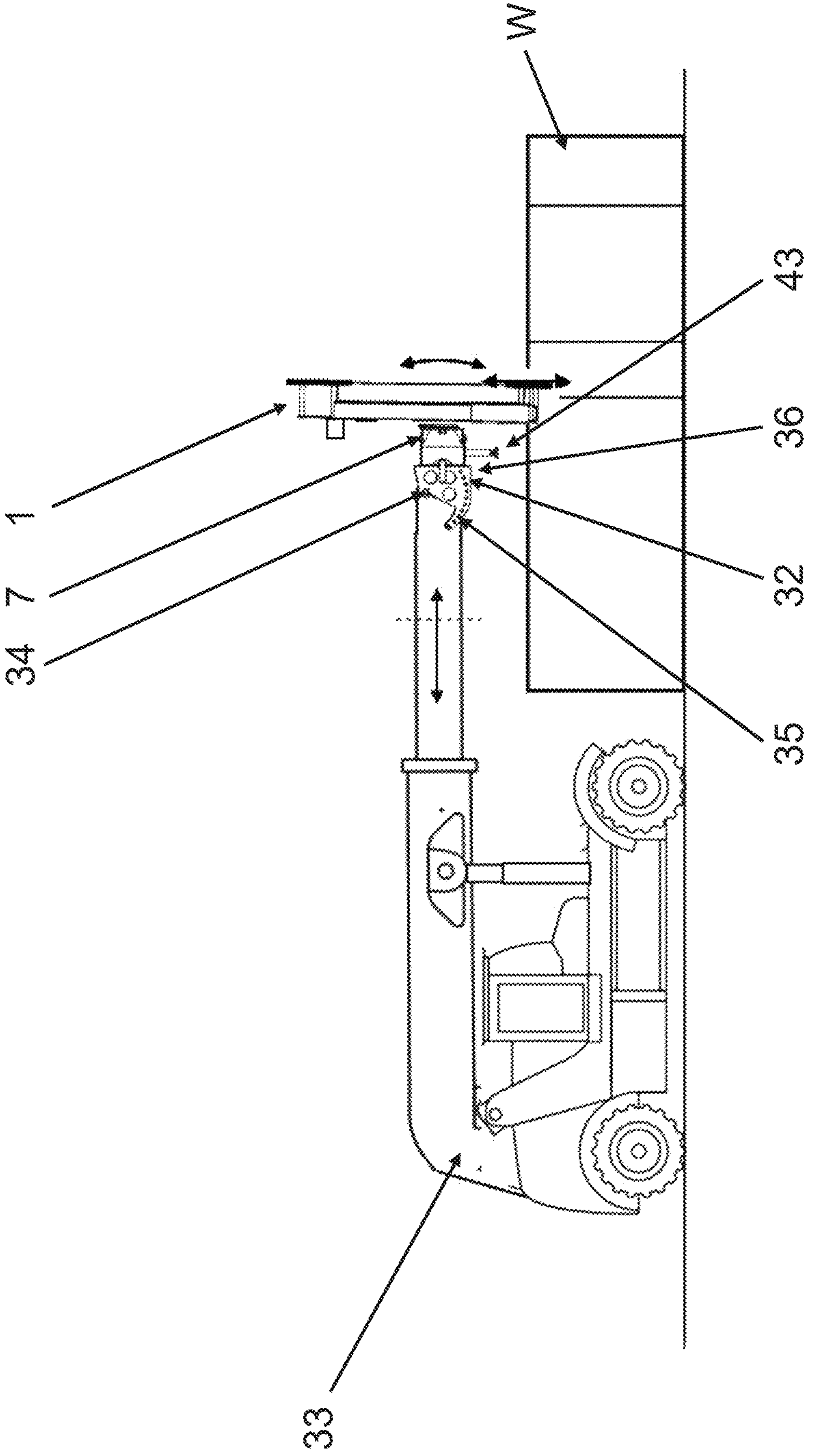

(58) Field of Classification Search
USPC .......................................................... 83/788
See application file for complete search history.

(56) References Cited

FOREIGN PATENT DOCUMENTS

| | | | | | |
|---|---|---|---|---|---|
| EP | 1086794 | A2 | | 3/2021 | |
| EP | 1142680 | A2 | | 10/2021 | |
| FR | 596906 | A | | 11/1925 | |
| GB | 190518465 | A | | 11/1906 | |
| JP | 07164429 | A | | 6/1995 | |
| JP | 2014069529 | A | * | 4/2014 | |
| KR | 20190097842 | A | * | 8/2019 | |
| WO | WO-0012250 | A1 | * | 3/2000 | ......... B23D 57/0007 |

* cited by examiner

CABLE SAW

CROSS-REFERENCE TO RELATED APPLICATION

This application is a national stage application of International Application No. PCT/EP2022/053198, filed Feb. 10, 2022, which claims priority to Austria Patent Application No. A50093/2021, filed Feb. 12, 2021, both of which are herein incorporated by reference in their entireties.

BACKGROUND OF THE INVENTION

(1) Field of the Invention

The invention relates to a cable saw for cutting up a solid workpiece, in particular a concrete or stone block, having at least one circulating saw cable driven by a drive, at least one guide device for guiding the driven saw cable, wherein the guide device is designed to position a sawing section of the driven saw cable with the workpiece, which sawing section is to be brought into engagement with the workpiece to be cut, wherein the guide device allows several movement directions, and therefore, in addition to a delivering of the sawing section in the direction of the workpiece to be cut, at least one lengthening or shortening of the sawing section is also possible, and at least one cable-storage and cable-tensioning device for storing, releasing and/or tensioning the saw cable when changing the position and/or length of the sawing section.

(2) Description of Related Art

In such a cable saw, to cut stone blocks, a saw cable studded with diamond segments is usually pulled through the workpiece at a speed of up to 40 m/s (144 km/h) to split it.

In known stationary cable saws, such as those known from FR 596 906 A, an endless saw cable is usually guided over two deflection rollers. On the one hand, it is disadvantageous that the workpieces to be cut cannot be cut on site, but must be transported to the cable saw. On the other hand, it is disadvantageous that the cable saw has a fixed and limited sawing section and cutting height due to the fixed distance between the two deflection rollers and can only work on cable pressure, whereby the cable tension is usually not variable. Due to these disadvantages, the weight and size of the solid workpiece to be cut are also limited for these stationary cable saws.

In the case of mobile cable saws known, for example, from EP 1 086 794 A2, which are brought to the solid workpiece in order to cut it up, a disadvantage lies mainly in the fact that an open saw cable must be laid around the workpiece, which is then pressed into an endless saw cable. For this purpose, a hole must be drilled in the workpiece to allow the saw cable to pass through. A disadvantage is that the saw cable must be opened in order to pass through the workpiece. This is also disadvantageous because the saw cable cannot be guided precisely and thus an exact cut cannot be made. Since the saw cable is additionally guided around sharp edges, for example in the area of entry into the workpiece or in the area of exit from the workpiece, it is usually subject to increased wear and there is an increased risk of injury, since in the event of a cable break a relatively long section of the saw cable can lash out like a whip. Thus, a large safety zone must be established around the cable saw. Another disadvantage of such cable saws is the size of the guide device, which restricts mobile use, since the dimensions of such a saw mounted ready for use do not permit long transport distances. For this reason, such cable saws often have to be assembled ready for use on site.

It is therefore the task of the invention to specify an improved cable saw which enables a compact transport size and fast and safe use, while additionally providing a high degree of flexibility in changing the position and/or length of the sawing section by means of the guide device.

BRIEF SUMMARY OF THE INVENTION

This task is solved by a cable saw with the features of claim 1.

By the fact that the guide device has a lever gear with at least one pivot lever rotatably hinged to a base holder, wherein the lever gear converts a rotary movement of the pivot lever into a movement of the deflection rollers forming the sawing section between themselves directed towards or away from each other for lengthening and/or shortening the sawing section, a compact structure and a flexible change of the position and/or length of the sawing section can be realized by the guide device. With the lever gear of the guide device, the distance between the deflection rollers forming the sawing section between them can be easily changed by pivoting the pivot lever relative to the base holder in a rotational movement, so that at least a first deflection roller delimiting the sawing section is displaced in its position relative to the second deflection roller delimiting the sawing section. Advantageously, the cable saw can be used both in tension and in compression.

Advantageous embodiments and further developments of the invention result from the dependent claims. It should be noted that the features listed individually in the claims can also be combined with one another in any desired and technologically useful manner and thus reveal further embodiments of the invention.

According to an advantageous embodiment of the invention, it is provided that the guide device has a lever gear with at least two pivoted levers rotatably hinged on a base holder, wherein the lever gear converts a rotary movement of the pivot levers into a movement, directed towards or away from each other, of the deflection rollers forming the sawing section between them for lengthening and/or shortening the sawing section. This allows a particularly compact design and a particularly flexible change in the position and/or length of the sawing section by the guide device. With the lever gear of the guide device, the distance between the two deflection rollers forming the sawing section between them can be easily changed by swiveling the pivot levers in a rotary movement relative to the base holder so that both deflection rollers, which limit the sawing section, are displaced in their position relative to the base holder.

Particularly preferred is an embodiment of the invention which provides that the guide device for each of the movement directions has a cable-storage device assigned to the respective movement direction. With the assignment of the cable-storage device to the individual movement direction, the sawing section of the saw cable can be flexibly adapted to the desired cutting shape, cutting length, cutting width and cutting height. With the cable storage, the flexibly adaptable guide device can be constructed very compactly, since a cable-storage device is provided for each movement direction. This also makes it possible to reduce the size of the individual cable-storage devices, which in the event of cable breaks shortens the length of the saw cable whipping around, so that the required safety area can be designed to be smaller when cutting up the workpiece.

A particularly advantageous embodiment of the invention relates to the fact that the cable-storage device stores or releases saw cable via an increase and decrease of the roller spacing of deflection rollers forming the cable-storage device when the position and/or length of the sawing section is changed. By increasing and decreasing the roller spacing, the cable-storage device can very easily store and release the saw cable to the required extent when the guide device moves in the assigned direction. For this purpose, the change of the roller distance is advantageously coupled to the movement of the guide device in the assigned movement direction. Via this coupling of the roller spacing to the individual movement direction of the guide device, the cable storage can be constructed very simply and compactly when the position and/or length of the sawing section is changed. The coupling of the roller spacing of the deflection rollers to the movement of the guide device in the assigned direction ensures that the saw cable is always stored or released to the extent dependent on the movement.

A particularly advantageous embodiment of the invention provides that at least one pivoted lever in each case together with at least one auxiliary lever forms at least one parallelogram kinematics, the pivoted lever and the auxiliary lever in each case being rotatably hinged on the one hand to the base holder and on the other hand to a guide holder, one of the deflection rollers forming the sawing section between them being arranged on the guide holder. Preferably, two pivot levers each form a parallelogram kinematics together with an auxiliary lever, wherein the pivot lever and the auxiliary lever are each rotatably hinged on the one hand to the base holder and on the other hand to one of two guide holders, wherein one of the deflection rollers forming the sawing section between them is arranged on each of the guide holders. The parallelogram kinematics make it particularly easy to displace the guide holders in a defined movement relative to the base holder. The parallelogram kinematics between the base holder and the guide holders ensures in a simple manner that the guide holders remain in a perpendicular position to the base holder during the rotary movement of the pivot levers. For this purpose, advantageously in one embodiment of the invention, a parallelogram kinematics between the base holder and at least one guide holder can also be used, which is constructed according to the principle of a hydraulic parallel guide.

Particularly advantageous is an embodiment of the invention which provides that at least one pivot lever is curved or cranked in an L-shape in the swivel plane, wherein the pivot lever is in each case hinged at one lever end to the base holder, at the other, free lever end carries a deflection roller associated with the cable-storage device and at a position between the two lever ends, preferably at the vertex of the L-shape, is hinged to the guide holder. Via the pivot lever, which is curved or cranked in an L-shape in the swivel plane, the rotary movement of the pivot lever for displacement and/or shortening of the sawing section can be used simultaneously via the displacement of the deflection roller, which is arranged at the free end and is assigned to a cable-storage device, for storage, release and/or tensioning of the saw cable. With optimum design of the lever dimensions, a large part of the cable length required for lengthening and/or shortening the sawing section can be released and/or stored in this way. This means that further cable-storage devices can be avoided or reduced in size, so that a more compact design of the cable saw can be achieved.

An advantageous embodiment of the invention provides that the guide device has two main telescopic extensions, at least one main telescopic extension being arranged on a guide holder, wherein via the main telescopic extensions the delivering of the sawing section in the direction of the workpiece to be cut takes place. With the two main telescopic extensions, a particularly simple change of the position of the sawing section by the guide device is possible. The two main telescopic extensions advantageously allow a jointly coordinated delivering of the sawing section in the direction of the workpiece to be cut, but also an independent delivering of the sawing section in the direction of the workpiece to be cut. This enables a particularly flexible positioning of the sawing section relative to the workpiece to be cut. By arranging at least one main telescopic extension on a guide holder, the distance between the two main telescopic extensions can be changed simply by moving the guide holder relative to the base holder. With the parallelogram kinematics between the base holder and the guide holder, a parallel alignment of the main telescopic extensions to each other can be easily maintained when the distance is changed. Provided that both main telescopic extensions are each arranged on a guide holder, the distance between the main telescopic extensions can be maintained while maintaining parallel alignment by displacing the guide holders, provided that both guide holders are each connected to the base holder of the guide device via parallelogram kinematics. Main telescopic extension means any type of guidance of a translatory movement of a guided component.

According to an advantageous embodiment of the invention, it is provided that the main telescopic extensions have deflection rollers assigned in pairs to the cable-storage device, which can be changed in the extension position on both sides via the main telescopic extensions for delivering the sawing section in the direction of the workpiece to be cut. Changing the pull-out position of the deflection rollers arranged on the main telescopic extensions makes it particularly easy that delivering of the sawing section in the direction of the workpiece to be cut takes place by means of a translatory movement of the deflection rollers.

Particularly preferred is an embodiment of the invention which provides that the main telescopic extensions can be moved independently of each other and/or extended and retracted independently of each other. By changing the distance of the two main telescopic extensions relative to each other, the length of the sawing section can be varied in a very simple manner by displacing the main telescopic extensions in each case in one movement direction of the guide device. An outward displacement on both sides increases the distance between the main telescopic extensions and thus the length of the available sawing section, while an inward displacement on both sides reduces the distance between the main telescopic extensions and thus the length of the available sawing section. This allows the guide device of the cable saw to be quickly adjusted from a compact transport configuration to an enlarged saw configuration. By extending and retracting the main telescopic extensions, the deflection rollers forming the sawing section between them can be moved in translation very easily, in particular independently of one another, so that a flexible delivering of the sawing section in the direction of the workpiece to be cut is made possible.

According to a preferred embodiment of the invention, it is provided that the main telescopic extensions can be moved independently of each other. With an independent movement of the two main telescopic extensions relative to each other and absolutely to the workpiece, the guide device can be flexibly adapted and the position and/or length of the sawing section can be easily changed.

A particularly advantageous embodiment of the invention relates to the fact that a further deflection roller associated with a cable-storage device is arranged at the free end of a storage lever pivotably hinged to the base holder, the cable-storage device storing, releasing and/or tensioning saw cable by pivoting the storage lever. Via the storage lever hinged to the base holder, the deflection roller assigned to the cable-storage device can be easily displaced at the free end of the storage lever relative to the base holder in order to store, release and/or, in particular, tension the saw cable. With the deflection roller that can be displaced via the storage lever, the cable tension can be adjusted independently of the displacement of other deflection rollers. Thus, by displacing the storage lever, the cable tension can be maintained, for example, in the event of thermal elongation of the saw cable while maintaining the alignment of the other deflection rollers of the guide device. Wear of the deflection rollers can also be compensated for by displacing the deflection roller located at the free end of the storage lever relative to the base holder.

According to a preferred embodiment of the invention, it is provided that the storage lever with the deflection roller arranged thereon can be passively pivoted against an elastic restoring force. Passive pivoting of the storage lever against an elastic restoring force makes it particularly easy to maintain the cable tension.

A particularly advantageous embodiment of the invention provides that each pivot lever is assigned an independent swivel drive. By assigning independent swivel drives, the pivot levers can be adjusted particularly easily independently of one another. However, it is also conceivable that the two pivot levers are driven by one drive via a synchronous mechanism.

BRIEF DESCRIPTION OF THE SEVERAL VIEWS OF THE DRAWING(S)

Figure 2:
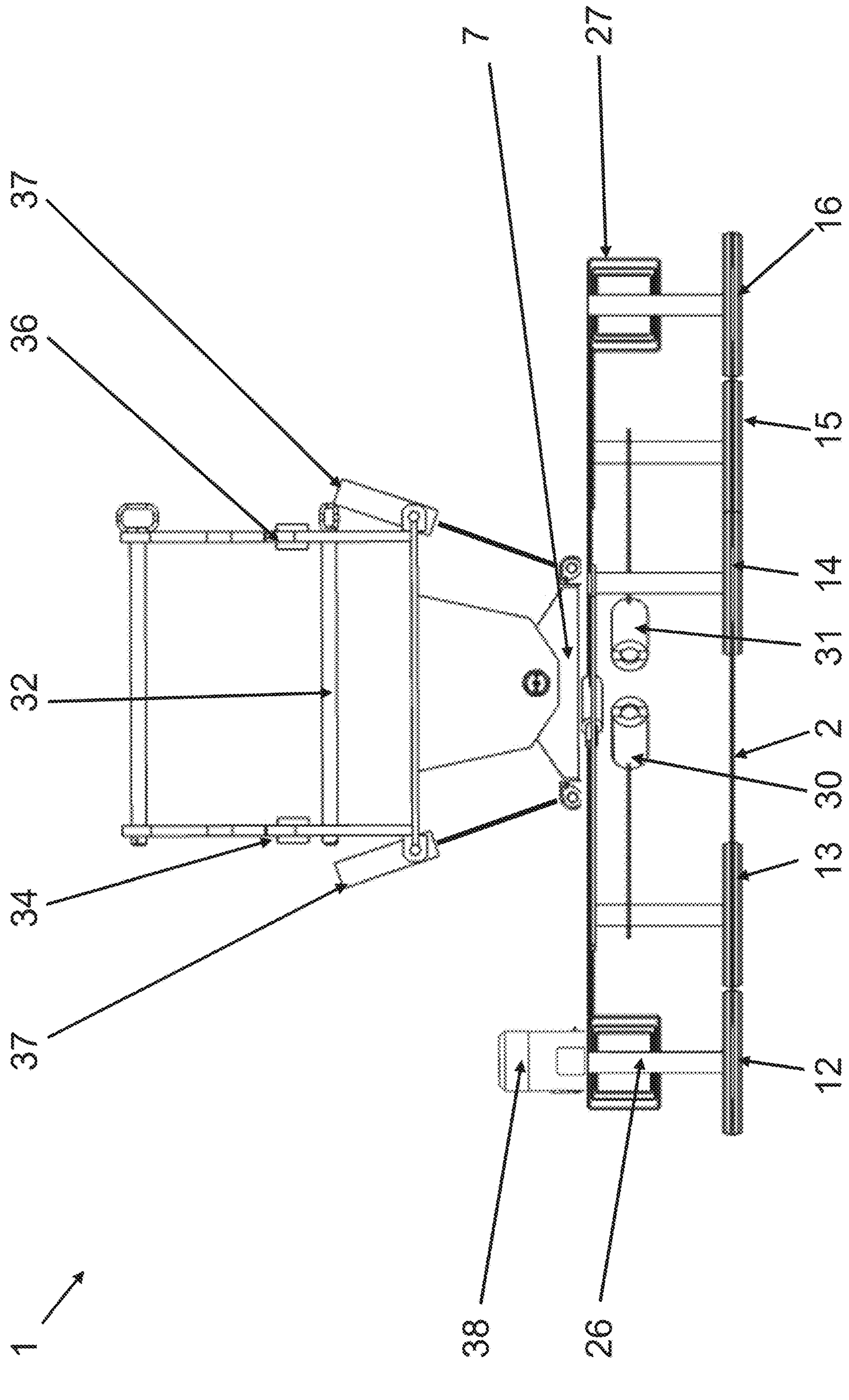
Figure 3:
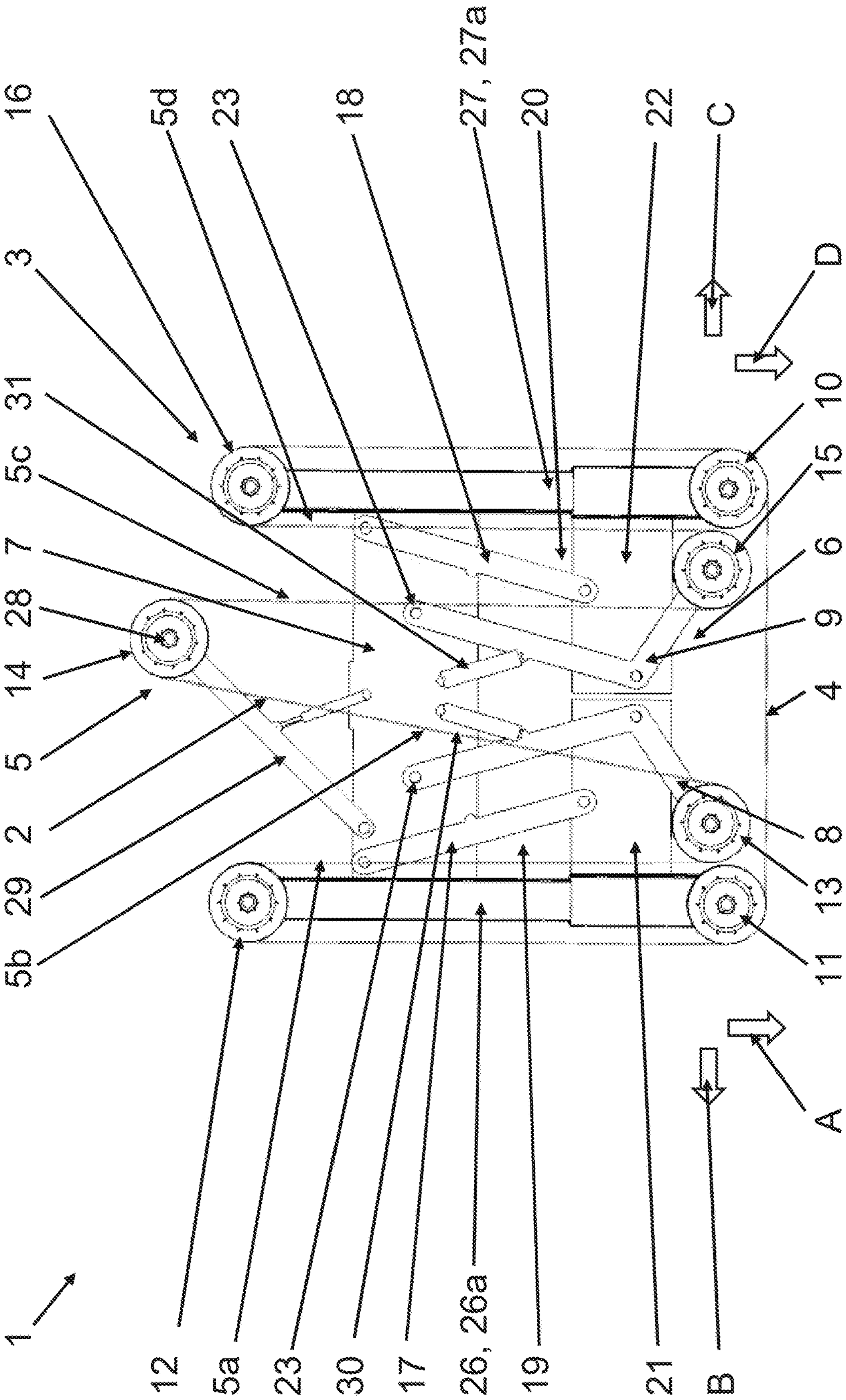
Figure 4:
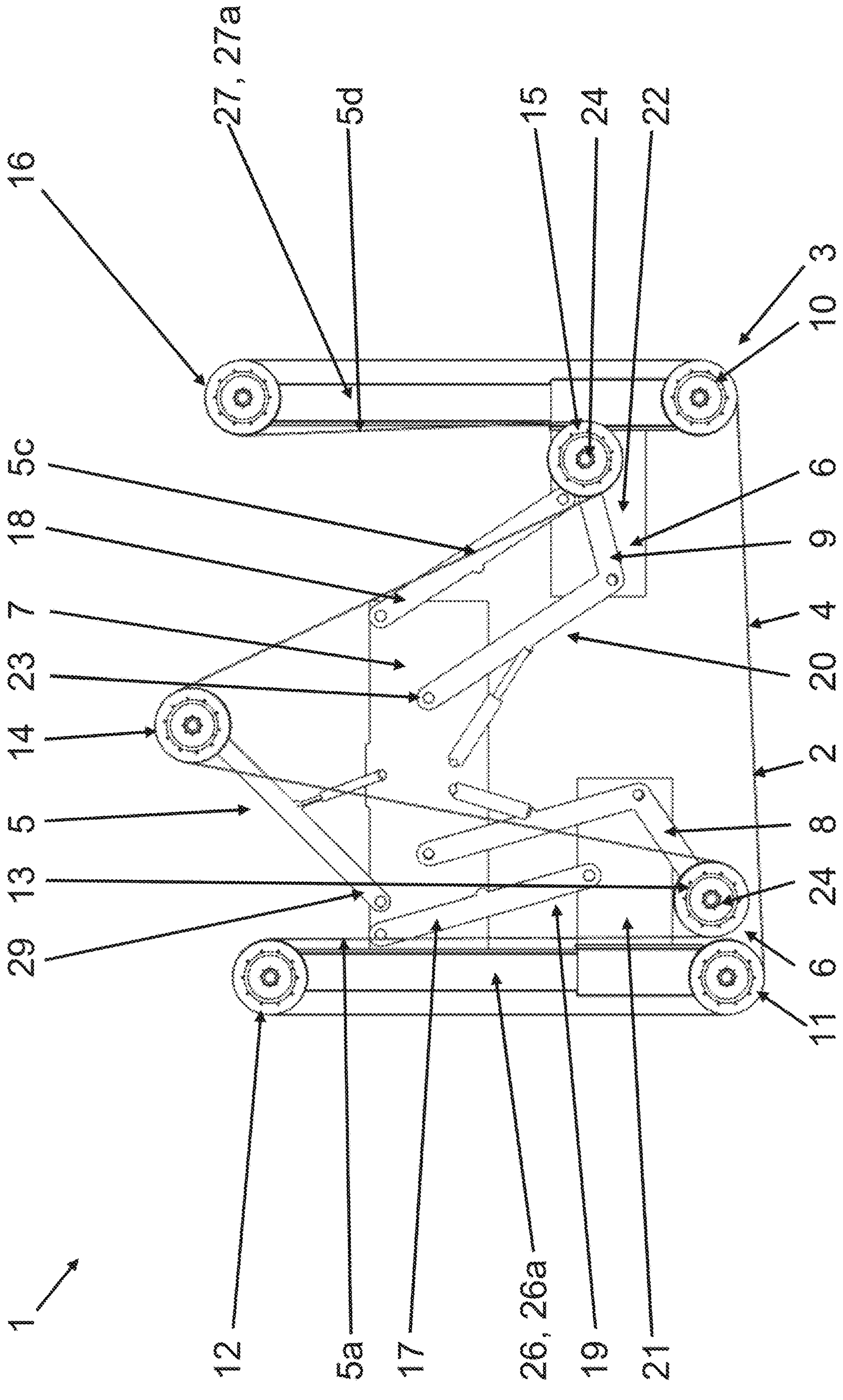
Figure 5:
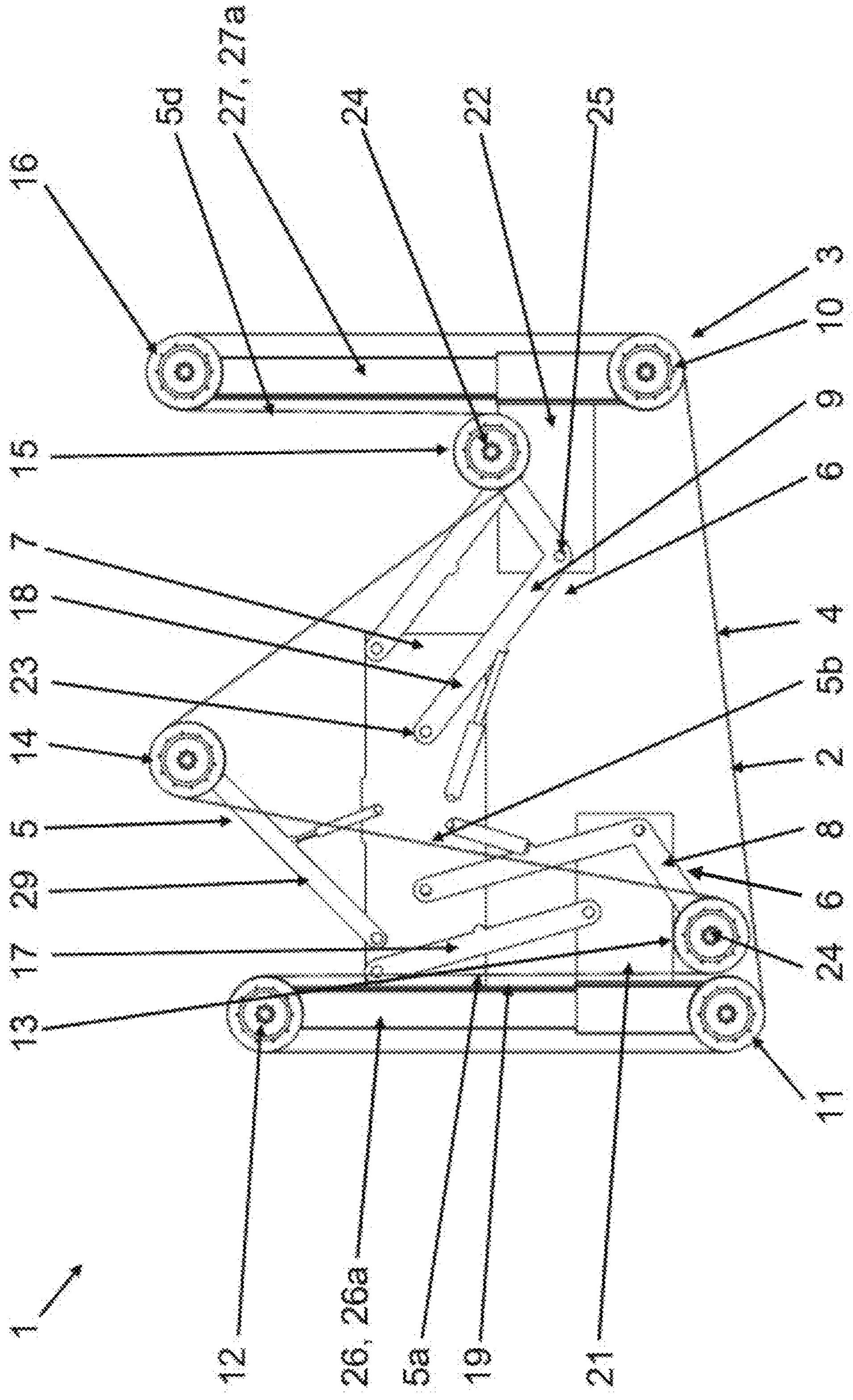
Figure 6:
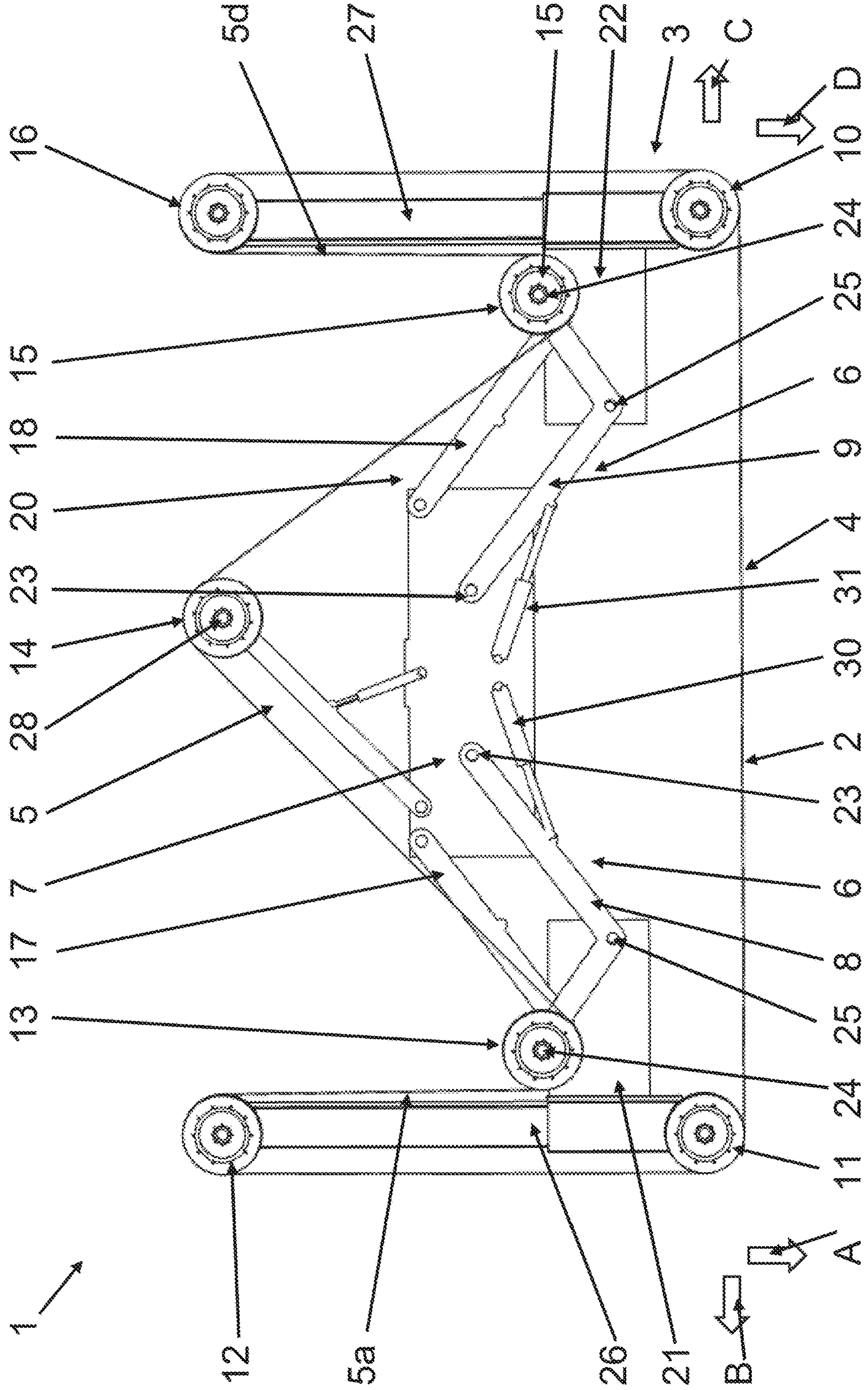
Figure 7:
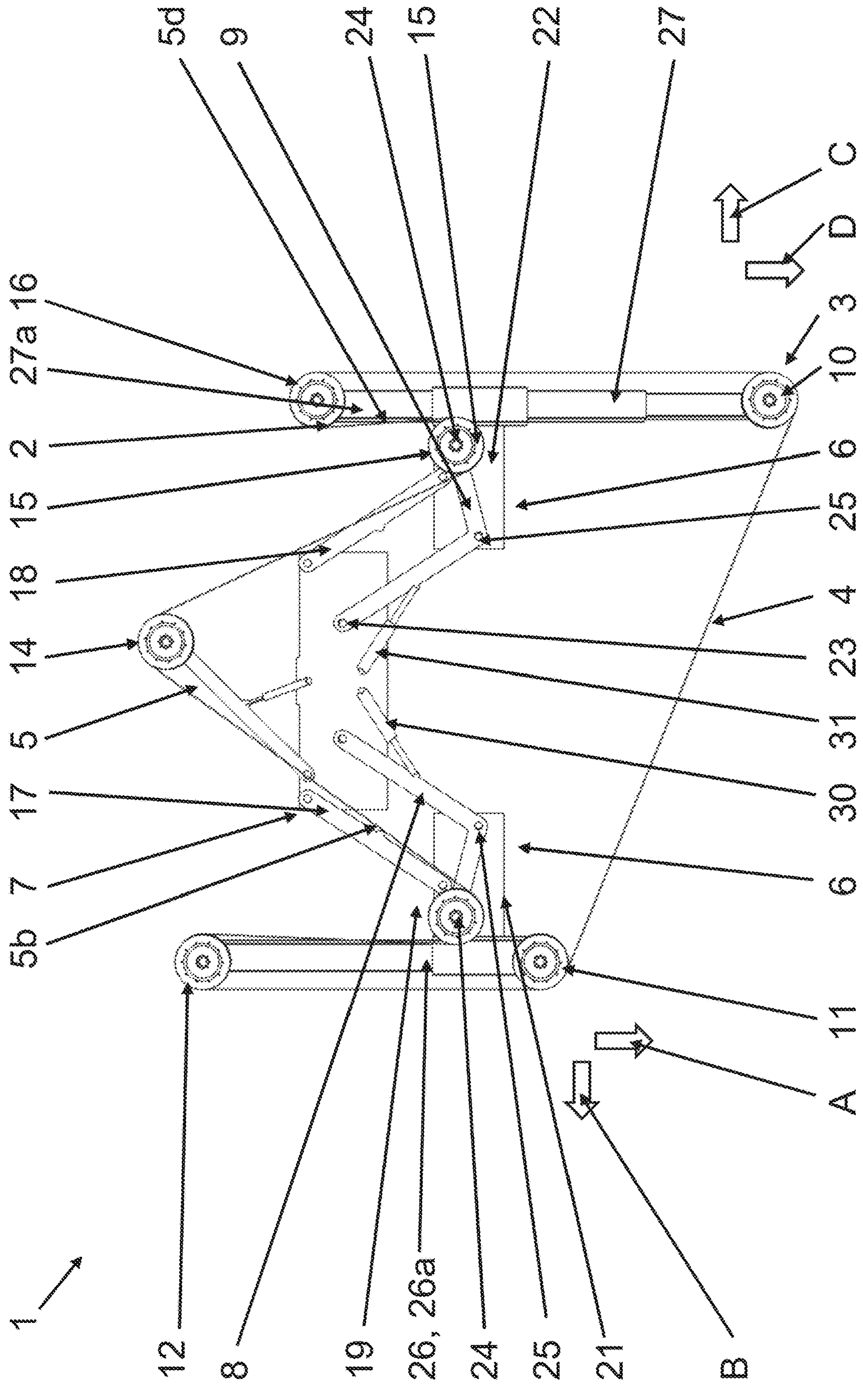
Figure 8:
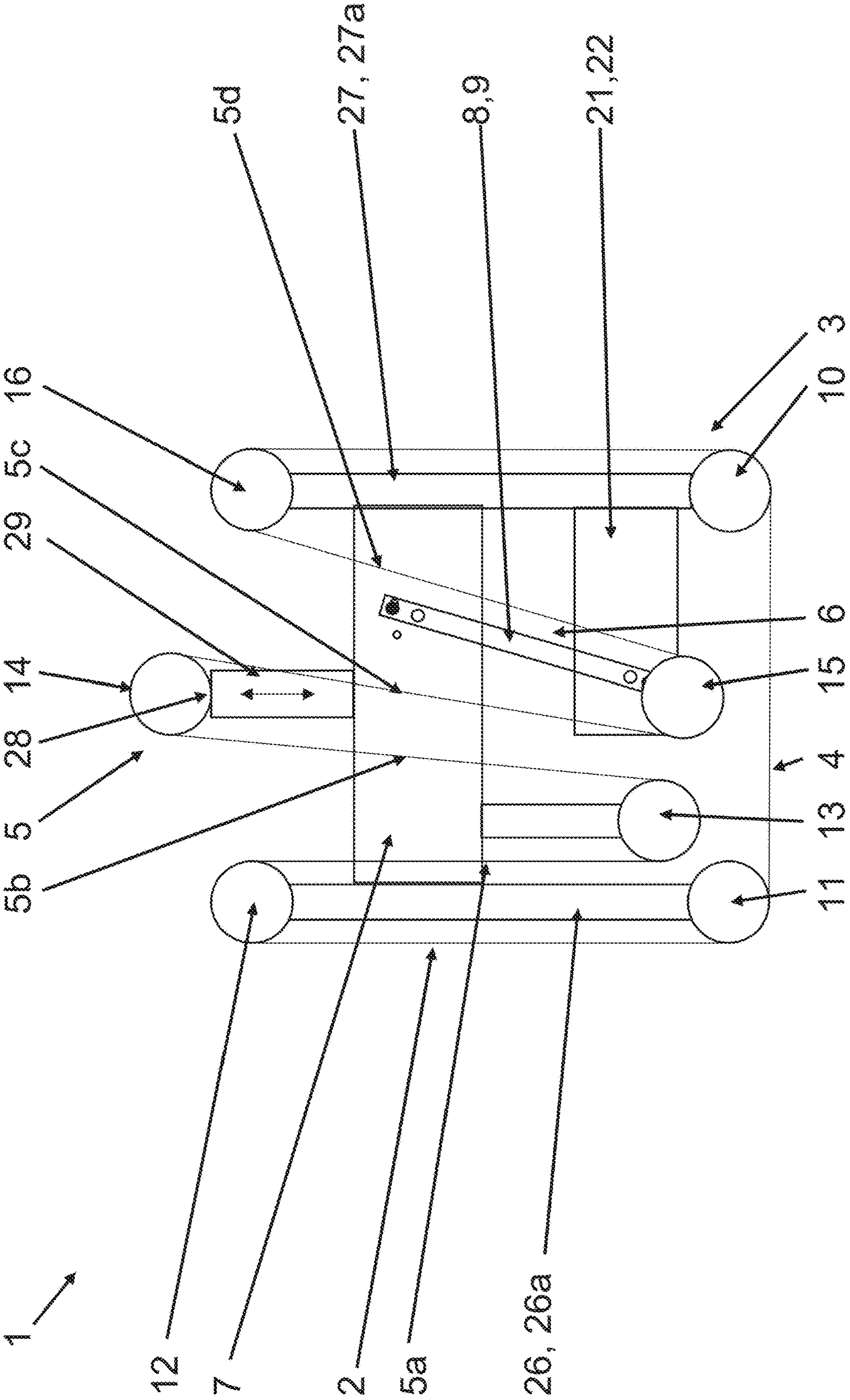
Figure 9:
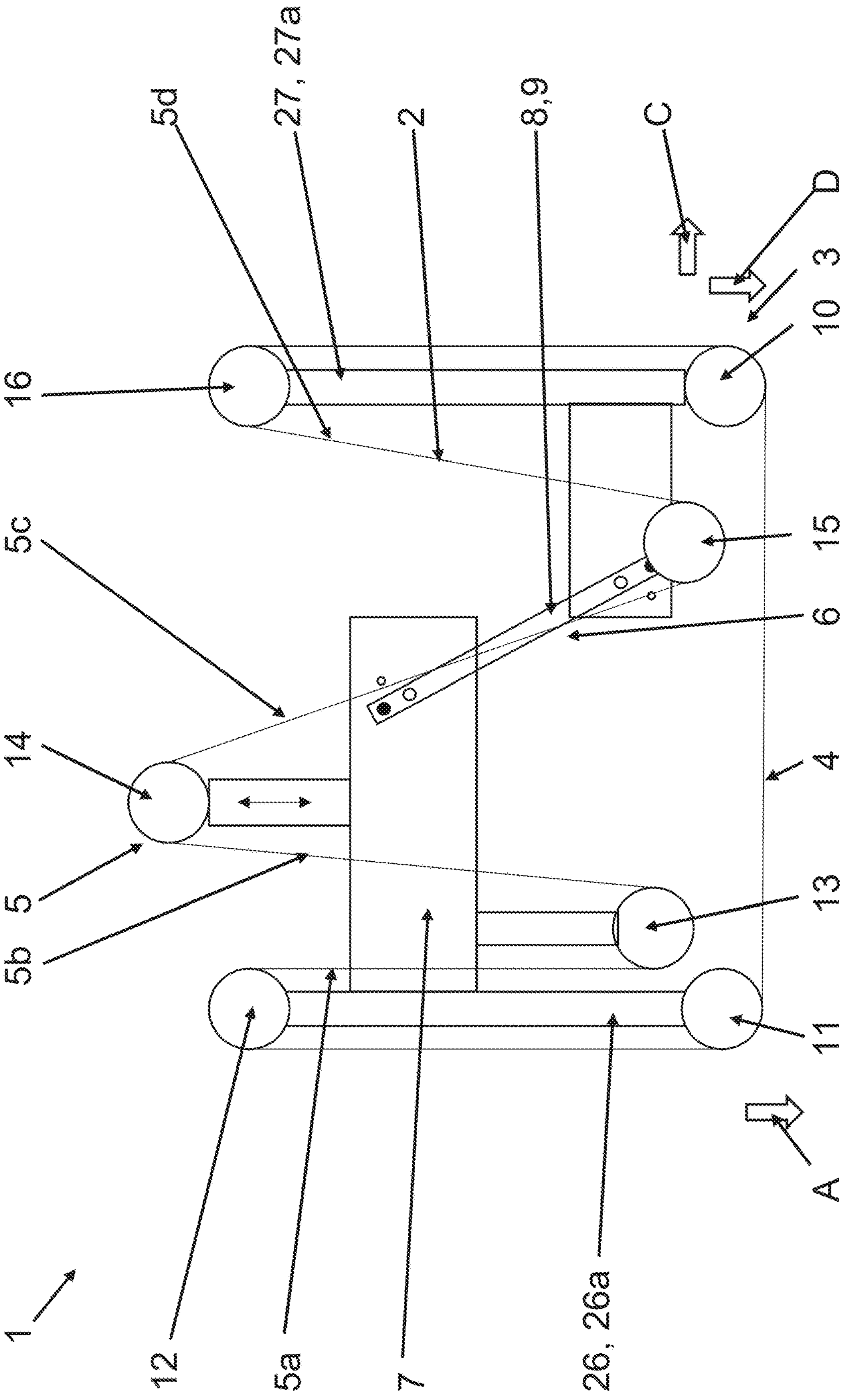
Figure 10:
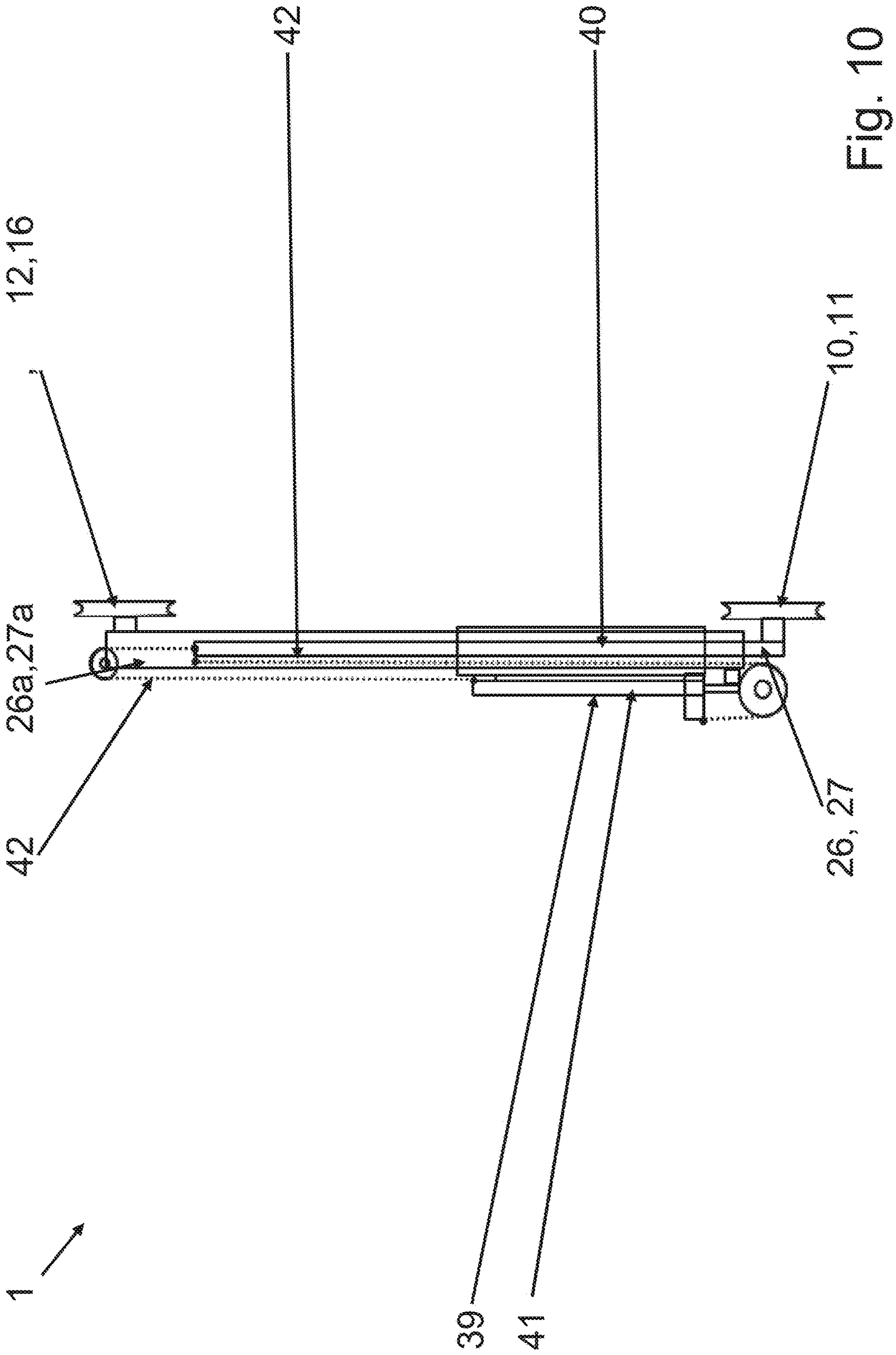
Figure 11:
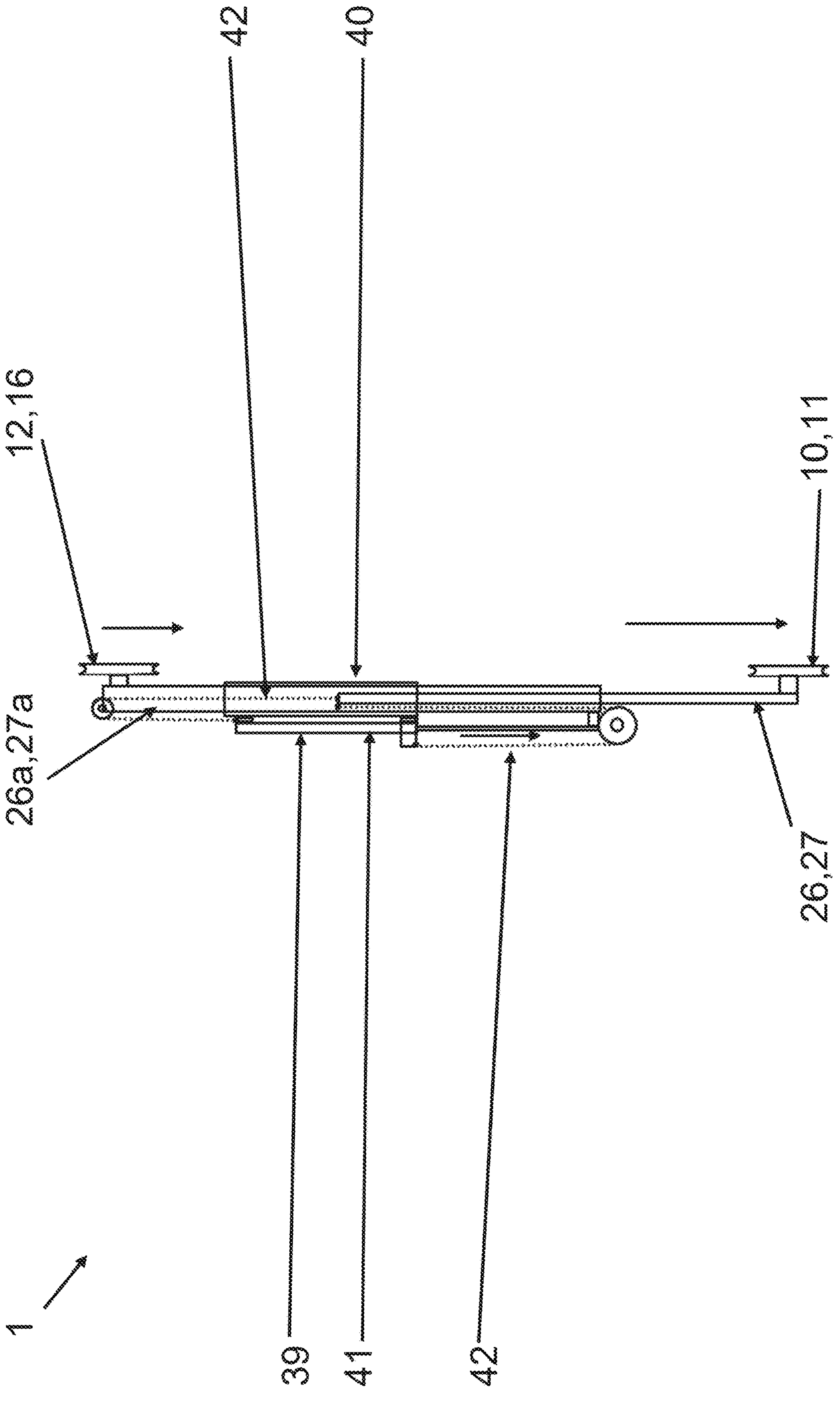

Further features, details and advantages of the invention will be apparent from the following description and from the drawings, which show examples of embodiments of the invention. Corresponding objects or elements are provided with the same reference signs in all figures. Showing:

FIG. 1 Cable saw on a telescopic loader according to the invention,

FIG. 2 View of the swivel device,

FIG. 3 Front view of a cable saw according to the invention in transport position, FIG. 4 Front view of the cable saw according to the invention partially swung out on one side, FIG. 5 Front view of the cable saw according to the invention completely swung out on one side, FIG. 6 Front view of the cable saw according to the invention completely swung out on both sides, FIG. 7 Front view of the cable saw according to the invention being delivered on one side, FIG. 8 Front view of another cable saw according to the invention in transport position, FIG. 9 Front view of the further cable saw according to the invention completely swung out on one side, FIG. 10 Side view of the retracted lower main telescopic extension, and FIG. 11 Side view of the extended lower main telescopic extension.

DETAILED DESCRIPTION OF THE INVENTION

A cable saw according to the invention is shown in FIG. 1 with the reference sign 1. The cable saw 1 is used for cutting up solid workpieces, in particular concrete or stone blocks. Here, the cable saw 1 is attached to a telescopic loader 33 via a switching device 32. For this purpose, it is provided that the cable saw 1 has a switching device 32 for attachment to a mobile carrier device 33 such as the telescopic loader. Within the scope of the invention, the mobile carrier device 33 can be attached via the switching device 32 to a carrier vehicle, in particular a driven utility vehicle, for example a wheeled excavator, a tracked excavator, a wheeled loader, a tractor with front loader or the like and precisely a telescopic loader, depending on the field of application. Thus, it is achieved that the mobile cable saw 1 can be transported to the place of use, e.g. also to exposed stones, whereby the workpieces W can be cut up on site. A complex and cost-intensive transport of the workpieces W towards the cable saw 1 is thus no longer necessary. The time required to finish cutting the workpiece W is substantially reduced. Since the cable saw 1 according to the invention can be used in a mobile manner on a carrier device 33, it is further achieved that it is no longer necessary to guide the workpiece W towards the saw cable 2, in particular to lift it, but that the saw cable 2 can now be guided towards the workpiece W. The switching device 32 has a suspension 34 and a perforated plate 35, in order to be able to mount the cable saw 1 tilted in steps with respect to the carrier device 33. A stand 43 can also be seen, by means of which the cable saw 1 can be placed on the ground or on a workpiece W to be cut. By supporting the cable saw 1 on the workpiece W to be cut, the carrier device 33 can be relieved during cutting.

FIG. 2 shows a view of the swivel device 36 between the switching device 32 and the base holder 7 of the guide device 3, via which the guide device 3 can be swiveled relative to the switching device 32. For this purpose, working cylinders 37 are provided which initiate the pivoting movement between the switching device 32 and the guide device 3. In this way, the guide device 3 can be aligned even before the cutting process and can also be swiveled at the switching device 32 during operation. The drive 38 of the cable saw 1, via which the saw cable 2 is driven in rotation, can be a purely hydraulic, a purely electric or an electrohydraulic drive 38 and could drive any of the deflection rollers 10, 11, 12, 13, 14, 15, 16 (FIG. 3) of the guide device 3. Preferably, the drive 38 is arranged at the third deflection roller 12 (FIG. 3). Thus, only one deflection of the saw cable 2 (FIG. 3) around the second deflection roller 11 (FIG. 3) takes place under increased tension. The saw cable 2 is thus driven in tension at a deflection roller 12 (FIG. 3) arranged downstream of the sawing section 4 (FIG. 3) in the drive direction of the saw cable 2. Thus, the sawdust produced during cutting of the workpiece W (FIG. 1) is conveyed from right to left. If, on the other hand, there is an interest in conveying the sawdust from left to right, the drive 38 should preferably be arranged on the seventh deflection roller 16 (FIG. 3). Then only a deflection of the saw cable 2 (FIG. 3) around the first deflection roller 10 (FIG. 3) takes place under increased tension. In this case, the saw cable 2 is thus also driven in tension at a deflection roller 16 (FIG. 3) arranged downstream of the sawing section 4 (FIG. 3) in the drive direction of the saw cable 2. With the deflection of the saw cable 2 (FIG. 3) under tension at only one deflection roller 10 or 11 (FIG. 3), the wear of the saw cable 2 and the deflection rollers 12, 13, 14, 15, 16 (FIG. 3) can be minimized, since frequent deflections, especially under tension, lead to high wear on the saw cable 2 and the deflection rollers 10, 11, 12, 13, 14, 15, 16 (FIG. 3).

FIG. 3 shows the cable saw 1 according to FIGS. 1 and 2 in a front view in transport position. In this transport position, the cable saw 1 has very compact external dimensions so that it can be easily transported. This is realized by a particularly compact design of the guide device 3. In the front view shown here, the guidance of the saw cable 2 driven via the drive 38 (FIG. 2) can be seen through the entire guide device 3. The drive 38 is coupled to a drive roller, preferably the third deflection roller 12, for transmitting the drive rotary motion to the saw cable 2, which converts the rotary motion of the drive 38 into a translatory motion of the saw cable 2. The saw cable 2 is preferably guided under a protective cover to a first deflection roller 10. This deflection roller 10 forms with the next, second deflection roller 11 a sawing section 4 which is brought into engagement with the workpiece W (FIG. 1) to be cut. When a workpiece W (FIG. 1) is cut, the sawing section 4 formed between the lower deflection rollers 10, 11 engages the workpiece W (FIG. 1) to be cut. For this purpose, the saw cable 2 is preferably provided with diamond segments which cut into the workpiece material when the concrete or stone block is divided. After this sawing section 4, the saw cable 2 is deflected at the second deflection roller 11 to the third deflection roller 12, which is preferably driven by the drive 38 (FIG. 2). Via the guide device 3 shown, the saw cable 2 can be guided in the cable saw 1 and the sawing section 4 formed by the saw cable 2 can be easily positioned relative to the workpiece W (FIG. 1). For this purpose, the guide device 3 allows several independent movement directions A, B, C, D, so that, in addition to a delivering of the sawing section 4 in the direction of the workpiece W to be cut, at least by the vertical displacement of the lower deflection rollers 10, 11, in particular also a change in the length of the sawing section 4 is possible at the same time or at another time, at least by the horizontal displacement of the lower deflection rollers 10, 11. The cable saw 1 has a plurality of cable-storage devices and cable-tensioning devices 5, 5*a*, 5*b*, 5*c* 5*d* for storing, releasing and/or tensioning the saw cable 2 when the position and/or length of the sawing section 4 is changed. A special feature of the cable saw 1 illustrated here is that the guide device 3 has, for each of the movement directions A, B, C, D, a cable-storage device 5*a*, 5*b*, 5*c*, 5*d* associated with the individual movement direction A, B, C, D.

Another advantageous feature of the cable saw 1 shown here is that the guide device 3 has a lever gear 6 with at least one pivot lever 8, 9 rotatably hinged to a base holder 7. The base holder 7 is connected to the suspension 35, if necessary, via the swivel device (FIG. 2). The lever gear 6 converts a rotational movement of the pivot lever 8, 9 into a movement of the deflection rollers 10, 11 forming the sawing section 4 between themselves, directed towards or away from each other, for lengthening and/or shortening the sawing section 4. FIGS. 8 and 9 show an embodiment of the cable saw 1 according to the invention with a pivoting lever 8, 9, which will be explained in more detail later. In the following an embodiment of the cable saw according to the invention is discussed first, in which the guide device 3 has a lever gear 6 with two pivoted levers 8, 9 rotatably hinged to a base holder 7. In this embodiment, the lever gear 6 can convert a rotational movement of the two pivoted levers 8, 9 into a movement, directed towards or away from each other, of the deflection rollers 10, 11 forming the sawing section 5 between themselves for lengthening and/or shortening the sawing section 4. This design of the cable saw 1 permits a particularly compact structure, as shown in FIG. 3, and a particularly flexible change in the position and/or length of the sawing section 4 by the guide device 3. By means of the lever gear 6 of the guide device 3, the distance between the two deflection rollers 10, 11 forming the sawing section 4 between them can be changed very easily by pivoting the pivoting levers 8, 9 in a rotary movement relative to the base holder 7, so that both deflection rollers 10, 11, which delimit the sawing section 4, are displaced in their position relative to the base holder 7, as shown in FIG. 6. An independent rotary actuator 30, 31 is provided on each pivot lever 8, 9, so that the pivot levers 8, 9 can very easily be rotated independently of each other relative to the base holder 7, as can be seen in FIGS. 4 and 5.

As shown in FIGS. 3 to 7, the pivoted levers 8, 9 each form a parallelogram kinematics 19, 20 together with an auxiliary lever 17, 18. For this purpose, the pivoted levers 8, 9 and the auxiliary levers 17, 18 are each rotatably hinged on the one hand to the base holder 7 and on the other hand to a guide holder 21, 22. The pivot levers 8, 9 and the auxiliary levers 17, 18 are aligned parallel to each other in every possible rotational position of the pivot levers 8, 9 relative to the base holder 7, so that the guide holders 21, 22 remain in a perpendicular position to each other relative to the base holder 7 during the rotational movement of the pivot levers 8, 9. On each of the guide holders 21, 22 there is arranged one of the deflection rollers 10, 11 forming the sawing section 4 between them. More precisely, in the embodiment shown here, the deflection rollers 10, 11 are arranged on two main telescopic extensions 26, 26*a*, 27, 27*a* of the guide device. These main telescopic extensions 26, 26*a*, 27, 27*a* are arranged on the guide holders and remain in a perpendicular position to one another during the rotary movement of the pivoted levers 8, 9. The main telescopic extensions 26, 26*a*, 27, 27*a* are used for delivering the sawing section 4 in the direction of the workpiece W to be cut (FIG. 1), as shown for example in FIG. 7.

The main telescopic extensions 26, 26*a*, 27, 27*a* are assigned deflection rollers 11, 12, 16, 10 in pairs. These deflection rollers 11, 12, 16, 10 can be changed in the pull-out position on both sides via the main telescopic extensions 26, 26*a*, 27, 27*a* for delivering the sawing section 4 in the direction of the workpiece W to be cut (FIG. 1).

A first pair of deflection rollers 12, 13, serves as a first cable-storage device 5*a*. After this cable-storage device 5*a*, the saw cable 2 is deflected via the deflection roller 13, towards a further deflection roller 14, which together with the deflection roller 13 forms a second cable-storage device 5*b*. While the first cable-storage device 5*a*, as will be explained in more detail later, serves for delivering the lower deflection roller 11 and the sawing section 4 in direction A and the workpiece W to be cut, which is preferably located under the sawing section 4 during cutting, as shown in FIG. 1, the second pair of deflection rollers 13, 14, on the other hand, forms a second cable-storage device 5*b* for the lateral movement direction B of the pair of deflection rollers 11, 12. As will be explained later, the second cable-storage device 5*b* serves to increase and decrease the size of the sawing section 4. The deflection roller 14, together with the deflection roller 15, forms a third cable-storage device 5*c* for the lateral movement direction C of the pair of deflection rollers 16, 10. As will also be explained later, the third cable-storage device 5*c* also serves to enlarge and reduce the sawing section 4. The sawing section 4 formed by the saw cable 2 begins with the lower deflection roller 10 of the deflection roller pair 16, 10 and ends with the lower deflection roller 11 of the deflection roller pair 11, 12. A fourth cable-storage device **5*d* is also assigned for delivering the sawing section 4 in the direction D of the workpiece W to be cut (FIG. 1). This fourth cable-storage device 5*d* is formed by the pair of deflection rollers 15, 16. A cable tensioning device 5 is also provided on the deflection roller 14, which ensures sufficient cable tension of the saw cable 2 in the guide device 3 and, among other things, also compensates for lengthening of the cable 2 due to temperature or wear during cutting of the workpieces W (FIG. 1**).

The first cable-storage device **5*a* is assigned to a vertical movement direction A for the delivering of the sawing section 4 in the direction of the workpiece W to be cut (FIG. 1) and, as can also be seen in FIG. 7 for the opposite, mirror-inverted, identical side, enables a vertical displacement of the lower deflection roller 10 of the deflection roller pair 11, 12, analogous to the deflection roller pair 16, 10. As a result, the sawing section 4, similar to what can be seen in FIG. 7, is also guided on the left side in the direction of the workpiece W to be cut (FIG. 1). With the displacement of the lower deflection roller 11 of the pair of deflection rollers 11, 12 downward, the sawing section 4 formed by the saw cable 2 is guided downward or through the workpiece W to be cut (FIG. 1), similar to what can be seen in FIG. 7. The saw cable 2 required for delivering of the sawing section 4 is released by the first cable-storage device 5*a* when the lower deflection roller 11 of the pair of deflection rollers 11, 12 is moved in the first movement direction A. When the lower deflection roller 11 of the deflection roller pair 11, 12 is moved upwards again in the first movement direction A, similar to what can be seen in FIG. 7 for the opposite side, the first cable storage device 5*a* can receive the saw cable 2 again. For this purpose, the distance between the deflection rollers 12, 13 of the pair of deflection rollers 12, 13 forming the first cable-storage device 5*a* is changed. To release saw cable 2, the position and distance of the deflection rollers 12, 13 of the first cable-storage device 5*a* is changed, as shown in FIG. 7 for the opposite side, in order to release correspondingly stored cable length from the first cable-storage device 5*a* for the delivering of the sawing section 4. By delivering the sawing section 4 in the direction of the workpiece W to be cut (FIG. 1), the lower deflection roller 11 is moved downward in accordance with the delivering via the first main telescopic extension 26, 26*a*. This first main telescopic extension 26, 26*a* is designed as a double telescopic extension 26, 26*a* with a two-part telescopic extension 26, 26*a* in opposite directions. Hereby, at the same time for delivering the lower deflection roller 11 via the telescopic extension 26, the distance of the upper deflection roller 12 of the first cable-storage device 5*a* via the first telescopic extension 26*a* to the further, fourth deflection roller 13 is reduced by half of the delivering. This releases the saw cable length stored in the first cable-storage device 5*a*. When the sawing section 4 is moved back, the distance of the deflection rollers 12, 13 of the first cable-storage device 5*a* is changed again by increasing the distance of the further, fourth deflection roller 13 to the upper, third deflection roller 12 of the first cable-storage device 5*a* by half of the resetting of the lower, second deflection roller 11 in order to store the saw cable 2 in the first cable-storage device 5*a* according to the resetting. The change in the distance between the deflection rollers 12, 13, which are combined in pairs to form the first cable-storage device 5*a*, is thus achieved by the third, upper deflection roller 12 of the first cable-storage device 5*a* being displaced relative to the further, fourth deflection roller 13 via the upper telescopic extension 26*a* of the first main telescopic extension 26, 26*a***.

The second cable-storage device **5*b* is assigned to the lateral or predominantly horizontal movement direction B of the deflection roller pair 11, 12 and, as can also be seen in FIG. 6, enables a lateral or horizontal displacement of the deflection roller pair 11, 12. With the outward displacement of the lower deflection roller 11 of the deflection roller pair 11, 12, the sawing section 4 formed by the saw cable 2 is enlarged, as can be seen in FIG. 6. The saw cable 2 required for the lateral extension of the sawing section 4 is released by the second cable-storage device 5*b* during the movement of the deflection roller pair 11, 12 in the second movement direction B. If the pair of deflection rollers 11, 12 is moved inward again in the first movement direction A, as can be seen in FIG. 3, the second cable-storage device 5*b* can receive the saw cable 2 again. For this purpose, the distance of the deflection rollers 13, 14 of the pair of deflection rollers 13, 14 forming the second cable-storage device 5*b* is changed synchronously with the displacement of the pair of deflection rollers 11, 12. For releasing the saw cable 2, the distance between the deflection rollers 13, 14 of the second cable-storage device 5*b* is shortened, as can be seen in FIG. 6, in order to release cable length stored for a corresponding lengthening of the sawing section 4 from the second cable-storage device 5*b*. When the sawing section 4 is shortened, the distance of the deflection rollers 13, 14 of the second cable-storage device 5*b* is increased again in order to store the saw cable 2 in the second cable-storage 5*b* according to the shortening. The change in the distance of the deflection rollers 13, 14 combined in pairs to form the second cable-storage device 5*b* is achieved by the fourth deflection roller 13 being arranged at a free end of the first pivot lever 8, which is cranked in an L-shape in the swivel plane and via which the roller distance of the pair of deflection rollers 13, 14 in the second cable-storage device 5*b* can be changed during the rotary movement of the pivot lever 8 relative to the base holder 7. For this purpose, the first pivot lever 8 is hinged at a lever end 23 to the base holder 7. The fourth deflection roller 13 associated with the second cable-storage device 5*b* is arranged at the other, free lever end 24 of the first pivot lever 8. As a result of the fact that the first pivot lever 8 is hinged to the first guide holder 21 at a position between the two lever ends 23, 24, in this case advantageously at the vertex 25 of the L-shape, the rotary movement of the pivot lever 8 can easily be used to change the deflection rollers 13, 14 forming the second cable-storage device 5*b***.

The third cable-storage device **5*c* is assigned to the lateral or horizontal movement direction C of the deflection roller pair 16, 10 and, as can also be seen in FIGS. 6 and 7, enables a lateral or horizontal displacement of the deflection roller pair 16, 10. With the outward displacement of the lower deflection roller 10 of the deflection roller pair 16, 10, the sawing section 4 formed by the saw cable 2 is enlarged, as can be seen in FIGS. 4 and 5. The saw cable 2 required for the lateral extension of the sawing section 4 is released from the third cable-storage device 5*c* when the deflection roller pair 16, 10 is moved in the third movement direction C. If the pair of deflection rollers 16, 10 is moved inward again in the third movement direction C, as can be seen in FIG. 3, the third cable-storage device device 5*c* can receive the saw cable 2 again. For this purpose, the distance between the deflection rollers 14, 15 of the pair of deflection rollers 14, 15 forming the third cable-storage device 5*c* is changed by displacing the deflection roller 15 in synchronism with the lateral displacement of the pair of deflection rollers 16, 10**.

To release saw cable 2, the distance between the deflection rollers 15, 16 of the third cable-storage device 5*c* is shortened, as shown in FIGS. 4 and 5, in order to release cable length stored for a corresponding lengthening of the sawing section 4 from the third cable-storage device 5*c*. When the sawing section 4 is shortened, the distance of the deflection rollers 15, 16 of the third cable-storage device 5*c* is increased again in order to store the saw cable 2 in the third cable-storage device 5*c* according to the shortening. The change in the distance between the deflection rollers 14, 15, which are combined in pairs to form the third cable-storage device 5*c*, is achieved by the sixth deflection roller 15 being arranged at a free end of the second pivot lever 9, which is cranked in an L-shape in the swivel plane and by means of which the roller distance of the pair of deflection rollers 14, 15 in the third cable-storage device 5*c* can be changed during the rotary movement of the pivot lever 9 relative to the base holder 7. For this purpose, the second pivot lever 9 is hinged at a lever end 23 to the base holder 7. The sixth deflection roller 15 associated with the third cable-storage device 5*c* is arranged at the other, free lever end 24 of the second pivot lever 9. As a result of the fact that the second pivot lever 9 is hinged to the second guide holder 22 at a position between the two lever ends 23, 24, in this case advantageously at the vertex 25 of the L-shape, the rotary movement of the pivot lever 9 can easily be used to change the deflection rollers 14, 15 forming the third cable-storage device 5*c*.

The fourth cable-storage device 5*d* is also assigned to a vertical movement direction D for the delivering of the sawing section 4 in the direction of the workpiece W to be cut and, as can also be seen in FIG. 7, enables a vertical displacement of the lower deflection roller 10 of the pair of deflection rollers 16, 10. As a result, the sawing section 4, as can be seen in FIG. 7, is guided on the right side in the direction of the workpiece W to be cut (FIG. 1). By displacing the lower deflection roller 10 of the pair of deflection rollers 16, 10 downward, the sawing section 4 formed by the saw cable 2 is guided downward or through the workpiece W to be divided (FIG. 1), as can be seen in FIG. 7. The saw cable 2 required for the delivering of the sawing section 4 is released by the fourth cable-storage device 5*d* when the lower deflection roller 10 of the pair of deflection rollers 16, 10 is moved in the movement direction D. If the lower deflection roller 10 of the pair of deflection rollers 10, 16 is moved up again in the fourth movement direction D, as can be seen in FIG. 6, the fourth cable-storage device 5*d* can take up the saw cable 2 again. For this purpose, the distance between the deflection rollers 15, 16 of the pair of deflection rollers 15, 16 forming the fourth cable-storage device 5*d* is changed.

For the release of saw cable 2, the position and the distance of the deflection rollers 15, 16 of the fourth cable-storage device 5*d*, as shown in FIG. 7, is changed in order to release correspondingly stored cable length from the fourth cable-storage device 5*d* for the delivering of the sawing section 4. By delivering the sawing section 4 in the direction of the workpiece W to be cut (FIG. 1), the lower deflection roller 10 is moved downward in accordance with the delivering via the second main telescopic extension 27, 27*a*. This second main telescopic extension 27, 27*a* is designed as a double telescopic extension 27, 27*a* with a two-part telescopic extension 27, 27*a* in opposite directions. Hereby, at the same time as the delivering of the lower deflection roller 10 takes place, the distance of the upper deflection roller 16 of the fourth cable-storage device 5*d* via the telescopic extension 27, 27*a* to the deflection roller 15 is reduced by half of the delivering. This releases the saw cable length stored in the fourth cable-storage device 5*d*. When the sawing section 4 is moved back, the distance of the deflection rollers 15, 16 of the fourth cable-storage device 5*d* is changed again by increasing the distance of the deflection roller 15 to the upper deflection roller 16 of the fourth cable-storage device 5*d* by half of the resetting of the lower deflection roller 10 in order to store the saw cable 2 in the fourth cable-storage device 5*d* according to the resetting. The change in the distance between the deflection rollers 15, 16, which are combined in pairs to form the fourth cable-storage device 5*d*, is thus achieved by the seventh, upper deflection roller 16 of the fourth cable-storage device 5*d* being displaced relative to the further, sixth deflection roller 15 via the upper telescopic extension 27*a* of the second main telescopic extension 27, 27*a*. The telescopic extensions 26, 26*a*, 27, 27*a* are thus not only used to change the delivering of the saw cable, but are also used as cable-storage devices 5*a*, 5*d* via a controlled length change of the upper telescopic extensions 26*a*, 27*a* upwards and downwards.

The cable saw 1 also has a further cable-storage device 5. With this cable-storage device the fifth deflection roller 14 is also associated. This deflection roller 14 is located at the free end 28 of a storage lever 29, which is pivotably hinged to the base holder 7. By pivoting the storage lever 29 relative to the base holder 7, the further cable-storage device 5 can additionally store, release and/or, above all, tension saw cable 2. Via the deflection roller 14, which can be displaced with the storage lever 29, the cable tension can be adjusted independently of the displacement of other deflection rollers 10, 11, 12, 13, 15, 16. Thus, by displacing the storage lever 29, the cable tension can be maintained, for example, in the event of thermal elongation of the saw cable 2 while maintaining the alignment of the other deflection rollers 10, 11, 12, 13, 15, 16 of the guide device 3 with respect to each other. In addition, wear of the deflection rollers 10, 11, 12, 13, 14, 15, 16 can be compensated for via the displacement of the deflection roller 14 arranged at the free end of the storage lever 29. Advantageously, the storage lever 29 with the deflection roller 14 arranged thereon can be passively pivoted against an elastic restoring force. Preferably, the cable tension can be precisely adjusted with a control loop via a hydraulic cylinder on the accumulator lever 29, but it would also be conceivable in the simplest case to apply only spring force to the storage lever 29 with the deflection roller 14.

FIGS. 4 and 5 show a one-sided extension of the sawing section 4 on the cable saw 1. For this purpose, the third cable-storage device 5*c*, which is assigned to the lateral or horizontal movement direction C of the second main telescopic extension 27, 27*a*, releases the required saw cable 2. Hereby, the third cable-storage device 5*c* enables a lateral or horizontal displacement of the pair of deflection rollers 16, 10 together with the second main telescopic extension 27, 27*a*. With the displacement of the lower deflection roller 10 of the pair of deflection rollers 16, 10 to the outside, the sawing section 4 formed by the saw cable 2 is enlarged. The saw cable 2 required for the lateral extension of the sawing section 4 is released from the third cable-storage device 5*c* when the deflection roller pair 16, 10 is moved in the third movement direction C. If the pair of deflection rollers 16, 10 together with the double telescopic extension 27, 27*a* are moved inwards again in the third movement direction C, as can be seen in FIG. 3, the third cable-storage device 5*c* can take up the saw cable 2 again. For this purpose, the distance between the deflection rollers 14, 15 of the pair of deflection rollers 14, 15 forming the third cable-storage device 5*c* is changed. To release saw cable 2, the distance between the deflection rollers 14, 15 of the third cable-storage device 5*c* is shortened, as can also be seen in FIG. 4 or 5, in order to release cable length stored for a corresponding extension of the sawing section 4 from the third cable-storage device 5*c*. When the sawing section 4 is shortened, the distance of the deflection rollers 14, 15 of the third cable-storage device 5*c* is increased again in order to store the saw cable 2 in the third cable-storage device 5*c* according to the shortening. The change in the distance of the deflection rollers 14, 15, which are combined in pairs to form the third cable-storage device 5*c*, is thus achieved by using the rotary movement relative to the base holder 7 via the second pivot lever 9 to change the distance of the deflection rollers 14, 15 forming the third cable-storage device 5*c*. For this purpose, the pivot lever 9 advantageously has an L-shape and is hinged at the vertex 25 of the L-shape, to the second guide holder 22, the deflection roller 15 being arranged at the free end of the pivot lever 9. Thus, when the sawing section 4 is lengthened and shortened, the cable length compensation takes place via the horizontal cable storage in the second 5*b* and the third cable-storage device 5*c*.

FIG. 6 shows the extension of the sawing section 4 on both sides by changing the distance between the two main telescopic extensions 26, 26*a*, 27, 27*a*. These two double telescopic extensions 26, 26*a*, 27, 27*a* are moved laterally to the workpiece W to be cut (FIG. 1) via the pivot levers 8, 9. In this way, with the telescopic extensions 26, 26*a*, 27, 27*a* folded in and retracted via the pivot levers 8, 9, a compact transport size can be realized, while, as can be seen in FIG. 6, with the main telescopic extensions 26, 26*a*, 27, 27*a* pivoted outwards on both sides, a wide sawing section 4 can be created between the lower deflection rollers 10, 11.

FIG. 7 shows the one-sided delivering of the sawing section 4 into the workpiece W. The right main telescopic extension 27, 27*a* has been actuated here independently of the left main telescopic extension 26, 26*a* for delivering the sawing section 4 in the direction of the workpiece W to be cut (FIG. 1). The right upper deflection roller 16 of the fourth cable-storage device 5*d* has been moved downward only by half the delivering of the lower deflection roller 10. Thus, cable storage in the fourth cable-storage device 5*d* takes place via the telescoping of the second telescopic extension 27, 27*a* in the ratio 1:2. With the double telescope 27, 27*a* of the second main telescopic extension 27, 27*a* via which both deflection rollers 16, 10 can be moved, cable storage thus takes place in the ratio 1:2. The distance between the two deflection rollers 15, 16 of the fourth cable-storage device 5*d* is not constant but can be flexibly adjusted via the double telescope 27, 27*a*. The one-sided delivering of the sawing section 4 shown in FIG. 7 has the advantage that the saw cable 2 does not always have to be driven equally on the left and right through a workpiece W, which, depending on the application, leads to a lower load on the saw cable 2 or can accelerate the sawing process.

It is also possible that delivering of the sawing section 4 takes place on both sides by means of the two main telescopic extensions 26, 26*a*, 27, 27*a*. This is because the main telescopic extensions 26, 26*a*, 27, 27*a* can be moved independently of one another and/or extended and retracted independently of one another. The main telescopic extensions 26, 26*a*, 27, 27*a* position the deflection rollers 10, 11, 12, 16 for delivering the sawing section 4 in the direction of the workpiece W to be cut (FIG. 1) by changing the extension position. Separate cable-storage devices 5*a*, 5*d* are formed at the two main telescopic extensions 26, 26*a*, 27, 27*a* in order to release stored saw cable 2 for the completed movements of the guide device 3 when the delivering of the lower deflection rollers 10, 11 or the sawing section 4 formed between them in the direction of the workpiece W to be cut (FIG. 1) takes place. Due to the fact that the two upper telescopic extensions 26*a*, 27*a* and the two lower telescopic extensions 26, 27 of the double telescopes 26, 26*a*, 27, 27*a* move downward in the ratio 50/100, the total cable length of the saw cable 2 as well as the width of the formed sawing section 4 remains unchanged during the delivering.

The cable tensioning device 5 with the deflection roller 14 serves the additional purpose of compensating for cable length changes which result, for example, from the diagonal alignment of the sawing section 4, as shown in FIG. 7, and which cannot be compensated for by the cable-storage devices 5*a*, 5*b*, 5*c*, 5*d*.

FIG. 8 shows a further embodiment of a cable saw 1 according to the invention. Here, the lever gear 6 converts a rotary movement of the pivot lever 8, 9 into a movement, directed towards or away from each other, of the deflection rollers 10, 11, which form the sawing section 4 between themselves for lengthening and/or shortening the sawing section 4. The deflection roller 11 is arranged here, as from the embodiment according to FIGS. 1 to 7, on a first main telescopic extension 26, 26*a* in a corresponding embodiment. However, the first main telescopic extension 26, 26*a* is directly mounted on the base holder 7. The deflection roller 10, on the other hand, is displaceable via the second main telescopic extension 26, 26*a* mounted on the guide holder 21, 22 for shortening and/or lengthening the sawing section 4 relative to the other deflection roller 11 and the base holder 7 by means of the pivot lever 8, 9, which is hinged between the base holder 7 and the guide holder 21, 22.

FIG. 9 shows the cable saw 1 according to FIG. 8, whereby here the deflection roller 10 is displaced via the rotation of the pivot lever 8, 9 relative to the base holder 7 to extend the sawing section 4. In order to obtain more stability, a parallelogram kinematics with an additional auxiliary lever can also be provided here. The pivot lever 8, 9 shown here is not driven by a swivel drive but can be rotated manually or by an auxiliary drive, such as a crane or a chain hoist, relative to the base holder 7 and secured by bolts in the position shown in FIG. 9.

FIG. 10 shows a side view of a retracted lower main telescopic extension 26, 26*a*, 27, 27*a*. The main telescopic extensions 26, 26*a*, 27, 27*a* each have a working cylinder 39 via which the double telescopic extension 26, 26*a*, 27, 27*a* can be extended. The push-out box 40 is fixed to the working cylinder housing 31. The upper telescopic extension 26*a*, 27*a* is connected to the upper deflection roller 12, 16, and the piston rod of the working cylinder 39. The working cylinder 39 adjusts the height of the upper telescopic extension 26*a*, 27*a* via the piston rod. The height of the lower telescopic extension 26, 26*a*, 27, 27*a* is adjusted via cable pulls 42 by the movement of the upper telescopic extension 26*a*, 27*a*. The two cable pulls 42 are necessary to exert both traction and compression.

As can be seen in FIG. 11, pushing down the upper telescopic extension 26*a*, 27*a* by means of the working cylinder 39 via the cable pulls 42 causes the lower telescopic extension 26, 26*a*, 27, 27*a* to be pushed down by double. For example, when the sawing section 4 with a main telescopic extension 26, 26*a*, 27, 27*a* is moved down by one meter, it is sufficient to move the upper deflection roller 12, 16 of the telescopic extension down by half a meter. This can be easily achieved by a controlled length change of the upper part 26*a*, 27*a* of the main telescopic extension 26, 26*a*, 27, 27*a*. The upward and downward length change of the main telescopic extension 26, 26*a*, 27, 27*a* can be achieved, for example, by means of working cylinders 39. Telescoping may also be accomplished by means of two hydraulic cylinders or a telescoping hydraulic cylinder, an electric linear drive, a rack and pinion drive, a jack screw drive with a trapezoidal screw or the like. In the case of the one-meter change in sawing depth suggested as an example above, a very long hydraulic cylinder would have to be provided to extend the lower extension 26, 26*a*, 27, 27*a* accordingly. In addition, another hydraulic cylinder would be required to retract the upper telescopic extension 26, 26*a*, 27, 27*a* by half a meter. Therefore, the design shown in FIGS. 10 and 11 provides a strong simplification by using only one working cylinder 39 for each double telescopic extension 26, 26*a*, 27, 27*a*, which first operates each of the upper telescopic extensions 26*a*, 27*a*. The necessary double length change of the lower telescopic extension 26, 27 is solved by a system with two cable pulls 42—or chain hoists with two deflection rollers at the upper telescopic extension 26*a*, 27*a*, which couples the lower telescopic extension 26, 27 with the upper telescopic extension 26*a*, 27*a*.

The proposed cable saw 1 has the advantage that the cable storage is divided among several cable-storage devices 5*a*, 5*b*, 5*c*, 5*d*. For the cable storage when the width of the sawing section 4 is changed, the deflection rollers 13, 14, 15 are provided, which compensate for the change in length of the saw cable 2 when the distance of the main telescopic extensions 26, 26*a*, 27, 27*a* is changed. In this case, the deflection rollers 11, 12 or 16, 10 are each moved along with the main telescopic extensions 26, 26*a*, 27, 27*a*.

For the change of the delivering of the saw cable 2, which is adjusted by the change of the length or height of the lateral main telescopic extensions 26, 26*a*, 27, 27*a*, the cable storage is provided in the second and the fourth cable storage 5*b*, 5*d*.

In a cable saw 1, it is advantageous to keep the number of deflections of the guide device 5 as low as possible, because each deflection contributes to the wear of the saw cable 3. In this sense, FIGS. 3 to 9 show variants of the cable saw 1 according to the invention, in which the guide device 5 comprises only seven deflection rollers.

LIST OF REFERENCE SIGNS

1 cable saw
2 saw cable
3 guide device
4 sawing section
5 cable-storage device and cable-tensioning device
6 lever gear
7 base holder
8 first pivot lever
9 second pivot lever
10 first deflection roller
11 second deflection roller
12 third deflection roller
13 fourth deflection roller
14 fifth deflection roller
15 sixth deflection roller
16 seventh deflection roller
17 first auxiliary lever
18 second auxiliary lever
19 first parallelogram kinematics
20 second parallelogram kinematics
21 first guide holder
22 second guide holder
23 first lever end
24 second lever end
25 vertex
26 26*a* first main telescope extension
27 27*a* second main telescope extension
28 free end of the storage lever
29 storage lever
30 first rotary actuator
31 second rotary actuator
32 switching device
33 telescopic loader
34 suspension
35 perforated plate
36 stand
37 working cylinder (swivel device)
38 drive
39 working cylinder (main telescopic extension)
40 push-out box
41 working cylinder housing
42 cable pulls
43 stand
W workpiece
A first movement direction
B second movement direction
C third movement direction
D fourth movement direction

The invention claimed is:

1. A cable saw for cutting a workpiece, the cable saw comprising:
- at least one circulating saw cable arranged to be driven by a drive and comprising a sawing section;
- at least one guide device for guiding the saw cable, wherein the guide device is arranged to move the sawing section along a cutting direction for cutting engagement with the workpiece, wherein the at least one guide device is arranged to allow several movement directions including the cutting direction and at least one lengthening or shortening of the sawing section, and wherein the guide device includes a plurality of deflection rollers, including a first deflection roller and a second deflection roller forming the sawing section therebetween; and
- at least one cable storage device and a cable tensioning device for storing, releasing and/or tensioning the saw cable when a position of the sawing section is changed and/or a length of the sawing section is changed,
- wherein the at least one guide device comprises:
  - a base holder;
  - a first guide holder, wherein the first deflection roller is coupled to the first guide holder;
  - a first pivot lever rotatably hinged to the base holder and to the first guide holder, wherein the first pivot lever is arranged to convert a rotational movement of the first pivot lever with respect to the base holder into a movement of the first guide holder and the first deflection roller towards or away from the second deflection roller to lengthen and/or shorten the sawing section; and
  - a first auxiliary lever rotatably hinged to the base holder and to the first guide holder, and wherein the first pivot lever and the first auxiliary lever form a parallelogram linkage.

2. The cable saw of claim 1, wherein the at least one guide device comprises, for each of the movement directions, a cable-storage device associated with the respective movement direction.

3. The cable saw of claim 2, wherein the cable-storage device stores or releases the saw cable via an increase or decrease of a roller spacing of deflection rollers forming the cable-storage device when changing the position and/or length of the sawing section.

4. The cable saw of claim 1, wherein the first pivot lever is curved in an L-shape along a swivel plane, wherein a free lever end carries a deflection roller assigned to the at least one cable storage device and is hinged to the first guide holder at a position between first and second ends of the first pivot lever.

5. The cable saw of claim 1, wherein the at least one guide device has two main telescopic extensions, wherein at least one of the main telescopic extensions is arranged on the first guide holder, wherein movement of the sawing section in the cutting direction is carried out via the two main telescopic extensions.

6. The cable saw of claim 5, wherein the two main telescopic extensions have associated deflection rollers which are variable in an extended position on both sides via the two main telescopic extensions for moving of the sawing section in the cutting direction.

7. The cable saw of claim 5, wherein the two main telescopic extensions are movable independently of one another and/or extendable and retractable independently of one another.

8. The cable saw of claim 1, wherein a further deflection roller associated with a cable-storage device is arranged at a free end of a storage lever, wherein the cable-storage device is arranged to store, release, and/or tension the saw cable by pivoting the storage lever.

9. The cable saw of claim 8, wherein the storage lever with the deflection roller arranged thereon is passively pivotable against an elastic restoring force.

10. The cable saw of claim 1, further comprising respective independent rotary actuators associated with each of the at least one pivot levers.

11. The cable saw of claim 1, wherein the at least one guide device comprises:

a second guide holder, wherein the second deflection roller is coupled to the second guide holder; and a second pivot lever rotatably hinged to the base holder and to the second guide holder, wherein the second pivot lever is arranged to convert a rotational movement of the second pivot lever with respect to the base holder into a movement of the second guide holder and the second deflection roller towards or away from the first deflection roller to lengthen and/or shorten the sawing section.

12. The cable saw of claim 11, further comprising a second auxiliary lever rotatably hinged to the base holder and to the second guide holder, and wherein the second pivot lever and the second auxiliary lever form a parallelogram linkage.

13. The cable saw of claim 12, wherein the second pivot lever is curved in an L-shape along a swivel plane, wherein a free lever end of the second pivot lever carries a deflection roller assigned to the at least one cable storage device and is hinged to the second guide holder at a position between first and second ends of the second pivot lever.

14. The cable saw of claim 13, wherein the at least one guide device has two main telescopic extensions, wherein at least one of the main telescopic extensions is arranged on the second guide holder, wherein movement of the sawing section in the cutting direction is carried out via the two main telescopic extensions.

* * * * *